No. 658,461. Patented Sept. 25, 1900.
R. E. OLDS.
VEHICLE TIRE.
(Application filed Nov. 6, 1899.)
(No Model.)

Witnesses
H. C. Smith.
W. B. Dougherty.

Inventor
Ransom E. Olds
By his Attys.

THE NORRIS PETERS CO., PHOTO-LITHO., WASHINGTON, D. C.

United States Patent Office.

RANSOM E. OLDS, OF LANSING, MICHIGAN.

VEHICLE-TIRE.

SPECIFICATION forming part of Letters Patent No. 658,461, dated September 25, 1900.

Application filed November 6, 1899. Serial No. 735,951. (No model.)

*To all whom it may concern:*

Be it known that I, RANSOM E. OLDS, a citizen of the United States, residing at Lansing, in the county of Ingham and State of Michigan, have invented certain new and useful Improvements in Vehicle-Tires, of which the following is a specification, reference being had therein to the accompanying drawings.

The invention consists in the construction of a vehicle-tire, and particularly in combining with a rim a series of elastic cups opening outward and supported or backed, so as to permit their elasticity to operate in all directions and compress or pack, so as ordinarily to form a compressed-air pocket within.

The invention further consists in the construction, arrangement, and combination of the various parts, as more fully hereinafter described.

Figure 1:
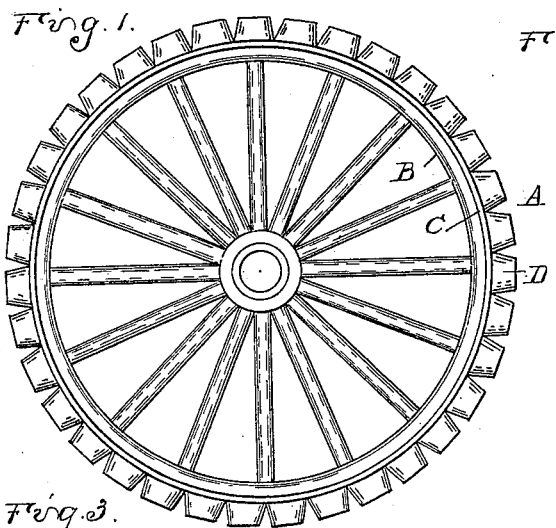
Figure 6:
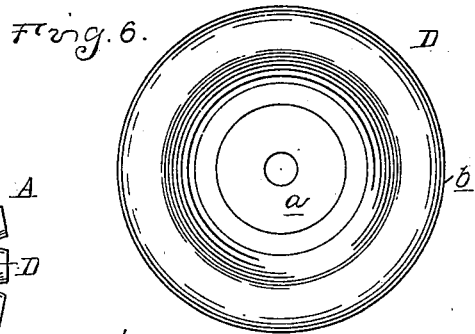
Figure 5:
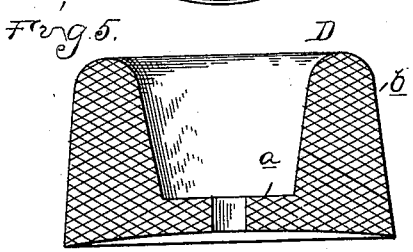
Figure 3:
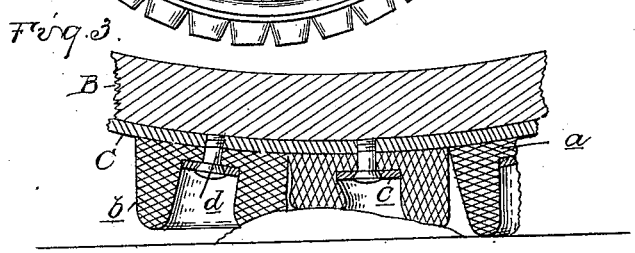
Figure 2:
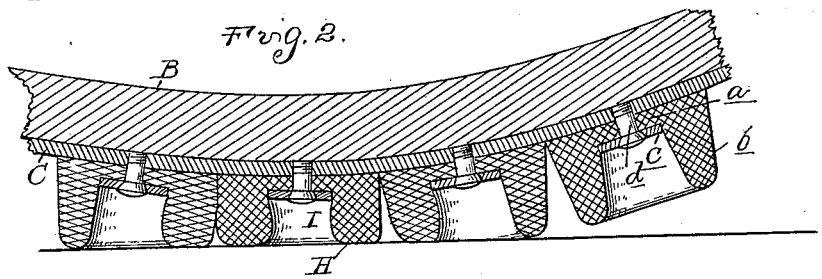
Figure 4:
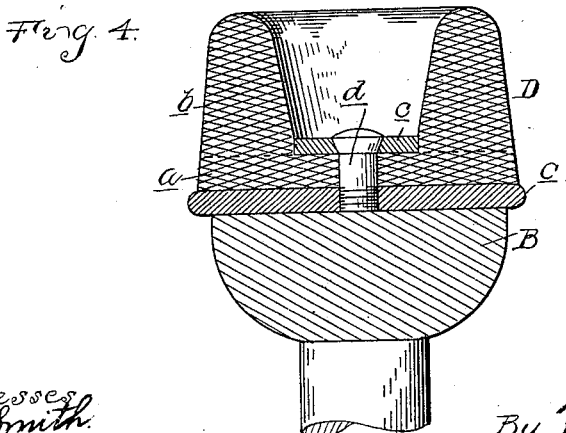

In the drawings, Figure 1 is a side elevation of a vehicle-wheel embodying my invention. Fig. 2 is a longitudinal section through a portion thereof, showing a compression effect in the rings in running over smooth pavement. Fig. 3 is a similar section showing the compression in passing over an obstruction. Fig. 4 is a cross-section through the rim and one of the rubber sections thereof. Fig. 5 is a longitudinal section through one of the rubber sections detached, and Fig. 6 is a plan of one of said rubber sections.

A represents an ordinary vehicle-wheel. This wheel may be of any suitable construction. I have illustrated it as a wooden wheel having a felly B and a metallic rim or tire C. Secured to this rim are a series of cup-shaped rubber sections, each having its base supported or backed upon the rim and secured thereto in any suitable manner. The construction which I prefer for these rubber sections is shown in the drawings, each one being like D. In this form the section comprises a base portion $a$, being that portion within the dotted lines in Fig. 4. This base portion has a wide and solid bearing upon the rim and is provided with the ring-shaped flange $b$. This ring-shaped flange I make tapering, as plainly shown in the drawings, and I preferably make both walls tapering, so as to make a cross-section of the rim at any point substantially a cross-section similar to a truncated cone. It will be understood that the terms "base" and "flange" are simply descriptive terms, for I preferably form them integral, but describe them as separate parts because of their functions. I may attach these separate sections to the tire in the manner shown in the drawings, which comprises a washer $c$, fitted upon the central portion of the base $a$ and within the flange thereon, and a screw or bolt $d$ passing therethrough and secured to the rim. When a series of these sections are secured to the tire or rim, they have substantially the appearance shown in Fig. 1 and form a discontinuous or sectional rubber facing therefor. I find in practice with such a rubber facing that in passing over pavements the flange of the cup will be compressed, so as to be shortened and thickened, as shown at H in Fig. 2, and will thereby form an air-pocket I within, which will reinforce the rubber section and assist its resiliency. This action of the flanges also makes a reduced pocket within whenever it is compressed, so that any mud or other similar material which may be forced therein will be compacted when a particular pocket is on the ground and in the mud, and as soon as the weight of the vehicle is taken from that particular pocket the ring assumes its normal shape and size, which will give a larger pocket than the pocket formed in the compressed condition of the ring, and thus release the grip of the flange upon the mud and cause it to easily drop out.

I am aware that heretofore there have been pockets which show the bearing-surface for tires formed of separated solid rubber blocks or separated hollow rubber sections or balls and also that there have been cup-shaped rubber sections, as shown in Patent No. 477,505; but such cup-shaped sections have been of a shape and nature similar to the vacuum-tips used upon harrows, &c. Such tips would grasp the pavement with a considerable suction, and thus tend to retard the vehicle, and also would turn outward because of the failure to provide a solid rim or backing for the outer edge of the ring. It would thus be easily destroyed and would not have the advantages set forth herein.

While I have shown circular flanges, in the broader scope of my invention I believe it includes such other forms as would give the results which the ring-shaped tapering flanges give, as herein described.

While I deem the pneumatic cushion formed within the cups is a desirable feature, the most important factor is the universal compression of the flanges, so as to reduce the pocket and practically loosen or expel any mud or dirt or other articles which may be forced therein while on the ground.

What I claim as my invention is—

1. A rubber tire for vehicles, consisting of a series of cup-shaped flanges adapted to extend entirely about and to be secured to the wheel-rim, the outer ends of the flanges being separated one from another forming a tread composed of independent elastic sections, and the inner ends or base portions of said flanges being each of equal or greater diameter than the diameter of its outer end, whereby a solid backing is provided for the outer edge of said flange.

2. A rubber tire for vehicles, consisting of a series of base sections or blocks adapted to extend entirely about and to be secured to the wheel-rim, and a series of cup-shaped flanges arranged one upon each block, the outer ends of the flanges being separated one from another forming a tread composed of independent elastic sections, and the inner ends or base portions of said flanges being each of equal or greater diameter than the diameter of its outer end, whereby a solid backing is provided for the outer edge of said flange.

3. A rubber tire for vehicles, consisting of a series of base sections or blocks adapted to extend entirely about and to be secured to the wheel-rim, and a series of cup-shaped flanges arranged one upon each block, each flange being shaped externally in the form of a frustum of a cone, the base portion of which rests upon its block.

In testimony whereof I affix my signature in presence of two witnesses.

RANSOM E. OLDS.

Witnesses:
　M. B. O'DOGHERTY,
　H. C. SMITH.